United States Patent [19]

Yamamoto

[11] Patent Number: 4,710,950
[45] Date of Patent: Dec. 1, 1987

[54] AUTOMATIC TELEPHONE ANSWERING APPARATUS WITH RECORDED CUE SIGNALS SEPARATING EACH INCOMING MESSAGE

[75] Inventor: Tadashi Yamamoto, Chiba, Japan
[73] Assignee: Sony Corporation, Tokyo, Japan
[21] Appl. No.: 897,920
[22] Filed: Aug. 19, 1986
[30] Foreign Application Priority Data Aug. 31, 1985 [JP] Japan ................................. 60-192454

[51] Int. Cl.$^4$ ............................................. H04M 1/65
[52] U.S. Cl. ..................................... 379/70; 360/74.4; 360/74.1
[58] Field of Search ..................... 379/74–77, 379/70, 82; 360/74.1, 72.2, 74.4

[56] References Cited

U.S. PATENT DOCUMENTS

| 4,120,006 | 10/1978 | Nagami et al. ...................... 360/72.2 |
| 4,421,954 | 12/1983 | Mita et al. ........................... 360/74.4 |
| 4,436,959 | 3/1984 | Nakatsuyama et al. ............ 360/74.1 |

FOREIGN PATENT DOCUMENTS

| 54-151807 | 11/1979 | Japan .................................. 360/72.2 |
| 55-45258 | 3/1980 | Japan ..................................... 379/70 |
| 59-207040 | 11/1984 | Japan .................................. 360/74.4 |

Primary Examiner—Raymond F. Cardillo
Assistant Examiner—James E. Tomassini
Attorney, Agent, or Firm—Lewis H. Eslinger; Alvin Sinderbrand Eslinger & Pelton

[57] ABSTRACT

A first recording medium of automatic telephone answering apparatus records an OGM (Outgoing Message) and a second recording medium records ICMs (Incoming Messages). Immediately after the first ICM is recorded, a first muting portion and a first cue signal (control signal) are sequentially recorded on the second recording medium. Then, the second recording medium is rewound to a position intermediate the length of the first cue signal and the automatic answering mode is reset. Before recording of the second ICM, a second muting portion of a predetermined duration is recorded on the second recording medium, so as to modify the first cue signal to form a second cue signal shorter than the first cue signal. The second ICM is then recorded on the second recording medium. This process is repeated for subsequent ICMs so that a short (second) cue signal marks the separation between each pair of successive ICMs and a long (first) cue signal marks the end of all the ICMs.

9 Claims, 4 Drawing Figures

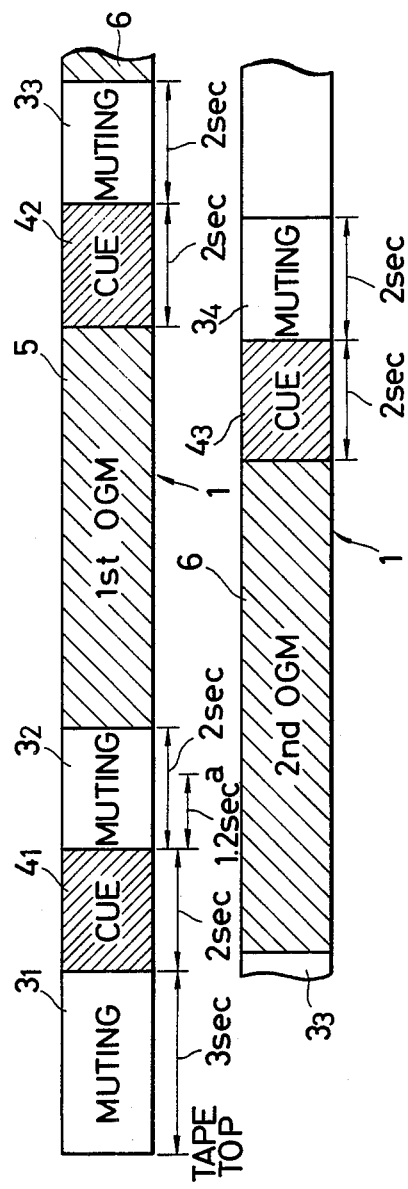
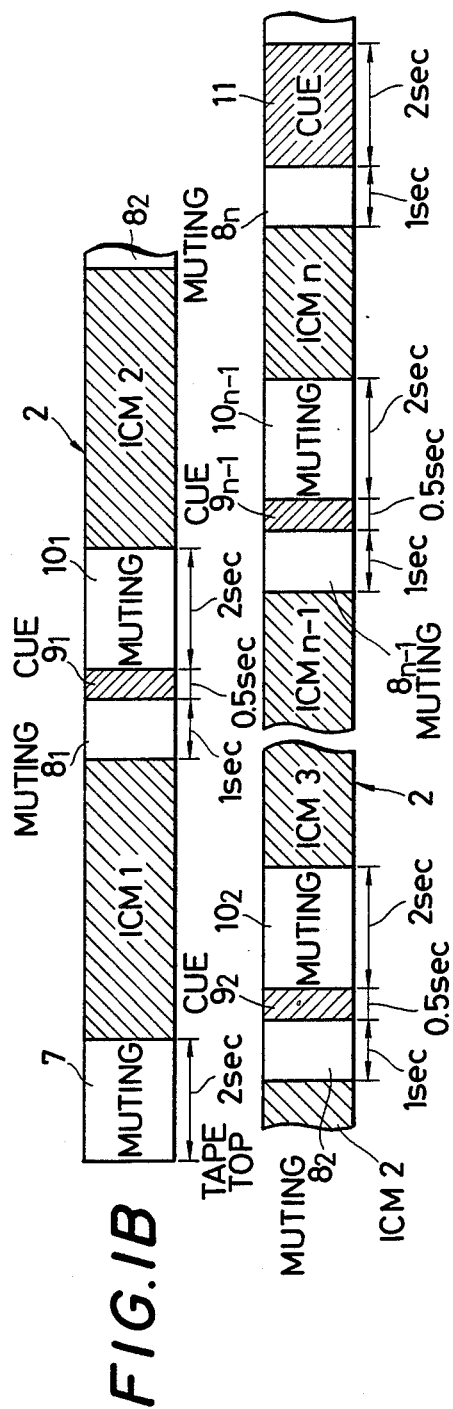
FIG.1A
FIG.1B

AUTOMATIC TELEPHONE ANSWERING APPARATUS WITH RECORDED CUE SIGNALS SEPARATING EACH INCOMING MESSAGE

BACKGROUND OF THE INVENTION

1. Field of the Invention

This invention relates to automatic telephone answering apparatus that sends an OGM (Outgoing Message) recorded on a magnetic tape in advance to a calling party, records an ICM (Incoming Message) from the calling party on the magnetic tape, and can reproduce the recorded messages later.

2. Description of the Prior Art

Upon reception of an incoming call, a conventional automatic telephone answering apparatus sends an OGM, which is recorded on a first magnetic tape and indicates the start of automatic recording, to a calling party through a telephone line, and thereafter records an ICM from the calling party on a second magnetic tape. In apparatus of this type, in order to find the beginning or end of the OGM or ICM on the magnetic tape, position detection of the magnetic tape must be performed. In a conventional position detection system, the number of rotations of a reel table corresponding to a desired position of the magnetic tape is stored, and the number of rotations of the reel table during a given tape movement is detected by a counter. The detected value is compared with the stored value to detect the desired position of the magnetic tape. In another conventional system, a cue signal is recorded on the tape and is reproduced to detect the desired position of the magnetic tape.

However, in the former method, depending on the number of rotations of the reel table, high precision is required of a tape drive mechanism, a rotation detection mechanism, and brake characteristics of the reel table, and the like. In addition, the program of the microprocessor used in the control circuit is complicated. Therefore, this detection method inevitably increases apparatus cost.

In the latter system, using the cue signal, division signals for the respective ICMs and the end signal for all the ICMs are normally recorded without being distinguished from each other. Therefore, the division between ICMs cannot be distinguished from the end of all the ICMs during detection.

In another system, cue signals of different frequencies are recorded in the divisions between the respective ICMs and at the end of all the ICMs. In this case, a circuit for forming different frequency signals and a circuit for detecting them are necessary.

In addition, another system that can record a cue signal indicating the end of a most recently recorded ICM when the apparatus is set in the automatic answering mode is known. However, in this system, if a tape cassette is removed from the apparatus during the automatic answering mode, the end signal cannot be recorded on the tape.

OBJECTS AND SUMMARY OF THE INVENTION

It is an object of the present invention to provide automatic telephone answering apparatus that can make divisions between a plurality of ICMs clear, that can distinguish the divisions from the end of the last ICM, and that can perform position detection of a recording medium with high accuracy and without employing complicated circuitry.

It is another object of the present invention to provide automatic telephone answering apparatus that has a recording format of a recording medium for recording ICMs so as to clearly identify and detect the divisions between a plurality of recorded ICMs and the end of all the ICMs.

It is still another object of the present invention to provide automatic telephone answering apparatus that can record a detection signal indicating the end of all the ICMs each time a new ICM is recorded.

It is still another object of the present invention to provide automatic telephone answering apparatus that forms the division signal between ICMs and the end signal of all the ICMs using a beep tone signal of the same frequency, and that can identify them with reference to the lengths of the signals.

It is still another object of the present invention to provide automatic telephone answering apparatus that records the division signal for each ICM between two muting portions, and that can easily modify the old end signal to a new division signal by forming a muting portion.

In accordance with one aspect of the invention, the foregoing and other objects are attained by the provision of automatic telephone answering apparatus comprising: a first recording medium for recording an outgoing message to be sent to a calling party in response to a call from the calling party; a second recording medium for sequentially recording incoming messages from calling parties along a given direction of said second recording medium after the outgoing message is sent to the calling party; recording means for recording on the second recording medium a first muting portion having a predetermined duration after a first incoming message from a calling party is recorded on the second recording medium and for recording on the second recording medium after the first muting portion a first control signal having a predetermined duration; means for moving the second recording medium after the first control signal is recorded to a location such that an intermediate portion of the first control signal is opposed to the recording means; means for setting an incoming call standby mode enabling the reproduction and sending of the outgoing message in response to an incoming call from a new calling party while the second recording medium is fixed in position; and means for reproducing and sending the outgoing message in response to the incoming call from the new calling party in the incoming call standby mode and moving the second recording medium forward, the recording means recording on the second recording medium a second muting portion having a predetermined duration, so that the first control signal is modified to form a second control signal having a duration shorter than that of the first control signal and lying between the first muting portion and the second muting portion and the recording means is positioned to record the second incoming message from the new calling party on the second recording medium after the second muting portion.

BRIEF DESCRIPTION OF THE DRAWINGS

A better understanding of the objects, features and advantages of the invention can be gained from the following detailed description of the preferred embodiment thereof, in conjunction with the appended figures of the drawing, wherein a given reference character always represents the same element or part, and wherein:

FIGS. 1A and 1B respectively show tape formats of an OGM tape and an ICM tape;

DESCRIPTION OF THE PREFERRED EMBODIMENT

Figure 2:
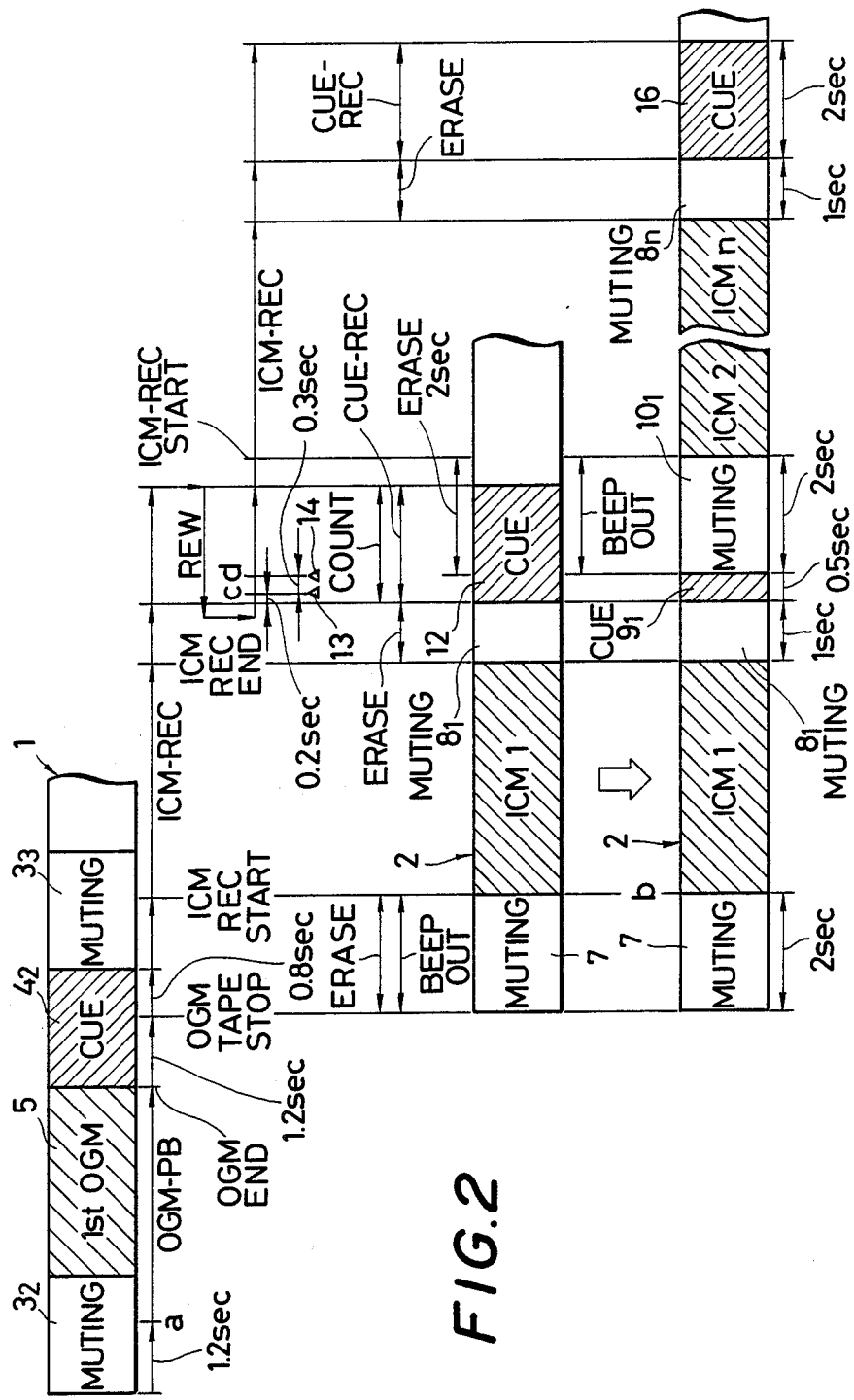
FIG. 2 is a diagram for explaining OGM reproducing and ICM recording procedures.

In the following description, an answering message is referred to as an OGM (Outgoing Message), and a message from a calling party is referred to as an ICM (Incoming Message). In the preferred embodiment, an automatic telephone answering apparatus includes an OGM tape 1 for recording OGMs and an ICM tape 2 for recording a plurality of ICMs along the longitudinal direction thereof, and first and second tape drive mechanisms for respectively driving the tapes 1 and 2.

FIGS. 1A and 1B show tape recording formats of the OGM tape 1 and the ICM tape 2, respectively.

A first OGM 5 and a second OGM 6 having different contents are recorded on the OGM tape 1 along the longitudinal direction of the tape, and are selectively reproduced. The ICM tape 2 records n ICMs, respectively identified as $ICM_1$ to $ICM_n$, thereon along the longitudinal direction thereof. Microcassette tapes are used as the tapes 1 and 2.

The OGM tape 1 has the following recording contents from the tape top: a 3-sec muting portion $3_1$, a 2-sec cue signal $4_1$, a 2-sec muting portion $3_2$, the first OGM 5 of a predetermined time period, a 2-sec cue signal $4_2$, a 2-sec muting portion $3_3$, the second OGM 6 of a predetermined time period, a 2-sec cue signal $4_3$, and a 2-sec muting portion $3_4$. The first and second OGMs 5 and 6 can be recorded for a maximum of 60 seconds.

The ICM tape 2 records a 2-sec muting portion 7 from the tape top, and then sequentially records the n ICMs identified as $ICM_1$ to $ICM_n$. In this case, identification portions consisting of 1-sec muting portions $8_1$ to $8_{n-1}$, 0.5-sec cue signals $9_1$ to $9_{n-1}$, and 2-sec muting portions $10_1$ to $10_{n-1}$ are respectively recorded between each two adjacent ICMs from $ICM_1$ to $ICM_n$. After the last ICM, i.e., the $ICM_n$, a 1-sec muting portion $8_n$ and a 2-sec cue signal 11 are recorded. The 2-sec cue signal 11 serves as the end signal for all the ICMs $ICM_1$ to $ICM_n$. The cue signals are beep tone signals within an audio frequency band.

The operation for recording the first and second OGMs 5 and 6 on the OGM tape 1 will now be described.

When an OGM key and a REC key provided on the apparatus are depressed at the same time, a REC lamp is illuminated, and the OGM tape 1 is rewound to its tape top. Next, an erase operation is performed for three seconds, the cue signal is recorded for two seconds, and the erase operation is again performed for two seconds, thereby automatically recording the muting portion $3_1$, the cue signal $4_1$, and the muting portion $3_2$. This portion serves as a top mark of the first OGM 5. The tape 1 is then stopped, and the REC lamp is flashed, thus notifying that the OGM-REC pre-operation is completed. When the REC key is again depressed, the REC lamp is illuminated in the flashing state, and the apparatus is set in the OGM-REC mode. The user records the OGM 5 through a microphone incorporated in the apparatus. The OGM 5 can be recorded for a maximum of 60 seconds. However, when the recording is completed with 60 seconds, the recording of the first OGM 5 can be ended by depressing a STOP key. After the recording of the first OGM 5, the cue signal is recorded for two seconds and the erase operation is performed for two seconds, thus automatically recording the cue signal $4_2$ and the muting portion $3_3$. The tape 1 is then stopped. At this time, the REC lamp is flashed to notify the user that OGM-REC pre-operation for the second OGM 6 is completed. Thereafter, the second OGM 6, the cue signal $4_3$, and the muting portion $3_4$ are recorded in the same manner as in the recording of the first OGM 5.

The operation for recording the ICMs will now be described.

The OGM tape 1 and the ICM tape 2 are loaded in the apparatus, the automatic answering mode is set, and the first or second OGM 5 or 6 is selected. When the automatic answering mode is set, an automatic answering lamp is illuminated. At the same time, the ICM tape 2 is rewound to its tape top.

After the OGM tape 1 is rewound to its tape top, the beginning of the selected first or second OGM 5 or 6 is searched.

When the first OGM 5 is selected, the cue signal $4_1$ can be detected for 1.2 seconds or longer within seven seconds from the tape top, and the muting portion $3_2$ can be detected for 1.2 seconds within three seconds thereafter. In this case, it is determined that the first OGM 5 is recorded in the proper format, and the tape 1 is stopped. Therefore, if the first OGM 5 is recorded in the proper format shown in FIG. 1A, an OGM recording/reproducing head is stopped at a point a in FIG. 1A.

When the second OGM 6 is selected, after the beginning of the first OGM 5 is searched, the cue signal $4_2$ can be detected within 70 seconds, and the muting portion $3_3$ can be detected within 3 seconds thereafter. In this case, it is determined that the second OGM 6 is recorded in the proper format, and the tape 1 is stopped. When the proper tape format is not satisfied, the automatic answering lamp is flashed and the automatic answering mode is cancelled.

With the above preparation, the apparatus is set in an incoming call standby mode. In this mode, when the first OGM 5 is selected, the OGM recording/reproducing head stands by for reproduction at the point a in FIG. 1A, and an ICM recording/reproducing head stands by for recording at the tape top position of the ICM tape 2.

In the standby mode, upon reception of a first incoming call, the telephone line is connected, and the OGM reproduction and ICM recording are performed through the steps shown in FIG. 2.

(1) First, the OGM tape 1 is reproduced from the point a, and the first OGM 5 is sent to the calling party through the telephone line.

(2) After the first OGM is reproduced, the cue signal $4_2$ is reproduced for 1.2 seconds, the OGM tape 1 is stopped and, at the same time, the ICM tape 2 is started to be subjected to the erase operation. At this time, a beep tone, i.e., a reproduction sound of the cue signal $4_2$, is transmitted to the calling party.

(3) Immediately after the 1.2-sec beep tone (the reproduction sound of the cue signal $4_2$), the same beep tone signal from another oscillator is continuously sent to the calling party through the telephone line. Therefore, the calling party hears the beep tone for at least 1.2 seconds. At the same time, the ICM tape 2 is erased for two seconds to record the muting portion 7, and the ICM recording/reproducing head reaches a point b.

(4) After the sending of the beep tone from the oscillator and the recording of the muting portion 7, the apparatus is set in the ICM-REC mode, and the $ICM_1$ from the calling party is recorded from the point b of the tape 2.

(5) When it is detected that the telephone line is disconnected, or the sound in the message or the voice of the calling party stops, or a predetermined period of time (e.g., 60 seconds) passes, the completion of the $ICM_1$ is detected, and the 1-sec erase operation is performed immediately after the $ICM_1$ while sending the beep tone from the oscillator to the calling party, thus recording the muting portion $8_1$. Subsequently, a 2-sec cue or control signal 12 is recorded, and the ICM tape 2 is stopped. During the recording of the 2-sec cue or control signal 12, the amount of travel of the ICM tape 2 is counted by a counter as the number of rotations of a reel mount.

(6) Next, the tape 2 is rewound until the counter is counted down to "0". Thereby, the ICM tape 2 is stopped near the boundary between the muting portion $8_1$ and the 2-sec cue signal 12.

(7) The ICM tape 2 then travels forward for 0.2 seconds. With this tape traveling, an ICM recording/reproducing head 13 and an ICM erase head 14 arrive at intermediate portions of the cue signal 12, indicated by c and d in FIG. 2. In this apparatus, the ICM erase head 14 is arranged in advance of the ICM recording/reproducing head 13 by a distance corresponding to 0.3 seconds. In other words, the ICM erase head 14 is located at a position in advance of the boundary between the muting portion $8_1$ and the cue signal 12 by a distance corresponding to 0.5 seconds. The ICM recording/reproducing head 13 and the ICM erase head 14 await a second incoming call in these positions. The cue signal 12 recorded for two seconds still remains on the ICM tape 2. On the other hand, the OGM tape 1 is rewound, and the beginning of the first OGM 5 is located.

(8) Upon reception of a second incoming call in this state, the telephone line is connected, and after the first OGM 5 of the OGM tape 1 is reproduced in the same manner as above, the 1.2-sec reproduction sound of the cue signal $4_2$ of the OGM tape 1 and the 2-sec beep tone from the oscillator are sent, and the ICM tape 2 is erased for two seconds. Since the 2-sec erase operation of the ICM erase head 14 is started from the position d in FIG. 2, the first cue or control signal 12 is erased except for a portion corresponding to about 0.5 seconds. The remaining portion (modified cue or control signal) serves as the second cue or control signal $9_1$.

(9) The $ICM_2$ is recorded on the ICM tape 2 in the same manner as in steps (4) and (5), and the muting portion $8_2$ and a 2-sec cue signal 16 are recorded thereafter. The ICM tape 2 is rewound and is stopped near the boundary between the muting portion $8_2$ and the cue signal 16, in the same manner as in steps (6) and (7). Thereafter, the ICM tape 2 travels forward so that the ICM erase head 14 is located at a position in advance of the boundary between the muting portion $8_2$ and the cue signal 16 by a distance corresponding to about 0.5 seconds. Next, the apparatus awaits a third incoming call. The 2-sec cue signal 16 is equivalent to the 2-sec cue signal 11 recorded after the last ICM in FIG. 1B. That is, if the $ICM_3$ is not recorded, the cue signal 16 serves as the end signal of all the recorded ICMs.

(10) If the $ICM_3$ is recorded, the cue signal 16 is modified to be the 0.5-sec cue signal $9_2$ in FIG. 1B in the same manner as in step (8).

(11) The same operation as described above is repeated to sequentially record the ICMs $ICM_3$ to $ICM_n$, thus completing the recording format of the ICM tape 2 shown in FIG. 1B.

Next, ICM reproduction will be described. When the ICM tape 2 is reproduced, the apparatus is switched from the automatic answering mode to a manual mode. After the ICM tape 2 is rewound to its tape top, the ICMs $ICM_1$ to $ICM_n$ are sequentially reproduced, and the user can hear these through a loudspeaker. In this case, the 0.5-sec cue signals $9_1$ to $9_{n-1}$ are also reproduced. Therefore, the divisions of the respective ICMs can be identified by the beep tones reproduced for 0.5 seconds. After the last ICM, namely $ICM_n$, since the reproduction sound (i.e., the beep tone) of the cue signal 11 serving as the end signal of all the ICMs is reproduced for two seconds, the end of the ICMs can be easily found. The user can then stop the ICM tape 2 at a desired position by detecting these beep tones. Alternatively, the ICM tape 2 can be automatically stopped upon detection of the 2-sec cue signal 11 and the corresponding 2-sec beep tone.

In step (6) of the above operation, when the ICM tape 2 is rewound and stopped while counting down, the ICM tape 2 is stopped at a position exceeding the beginning of the cue signal 12 and slightly entering the muting portion $8_1$ by inertia of the reel table. If the muting portion $8_1$ were not recorded, the ICM tape 2 would enter the $ICM_1$ and stop, resulting in malfunction. Therefore, the muting portions $8_1$ to $8_n$ in FIG. 1B are provided as buffer areas between the ICMs and the cue signals $9_1$ to $9_{n-1}$, 11, and the like.

The present invention is not limited to the characterization described in steps (6) and (7). For example, after the cue signal 12 is recorded, the ICM tape 2 can be rewound to be set in the standby mode so that the recording/reproducing head 13 is located directly at a position in advance of the beginning of the cue signal 12 by a distance corresponding to 0.2 seconds, and the erase head 14 is located at a position in advance of the beginning of the cue signal 12 by a distance corresponding to about 0.5 seconds. This also provides the effect described above.

When the muting portions $10_1$ to $10_{n-1}$ shown in FIG. 1B are not recorded, if the calling party hangs up a receiver immediately after the OGM is completed, the cue signal $9_2$ is recorded almost immediately after the cue signal $9_1$. During reproduction, since the cue signal is reproduced over 0.5 seconds, it may be confused with the end signal of all the ICMs, and the tape 2 may be stopped. The muting portions $10_1$ to $10_{n-1}$ are provided to prevent this. The muting portion 7 before the $ICM_1$ has a duration of two seconds. However, when the erase duration is insufficient and the beginning of the $ICM_1$ can not be recorded, the ICM tape 2 can be erased for three seconds from the tape top initially when the automatic answering mode is set. In this case, the muting portion 7 has a duration of 5 seconds.

Figure 3:
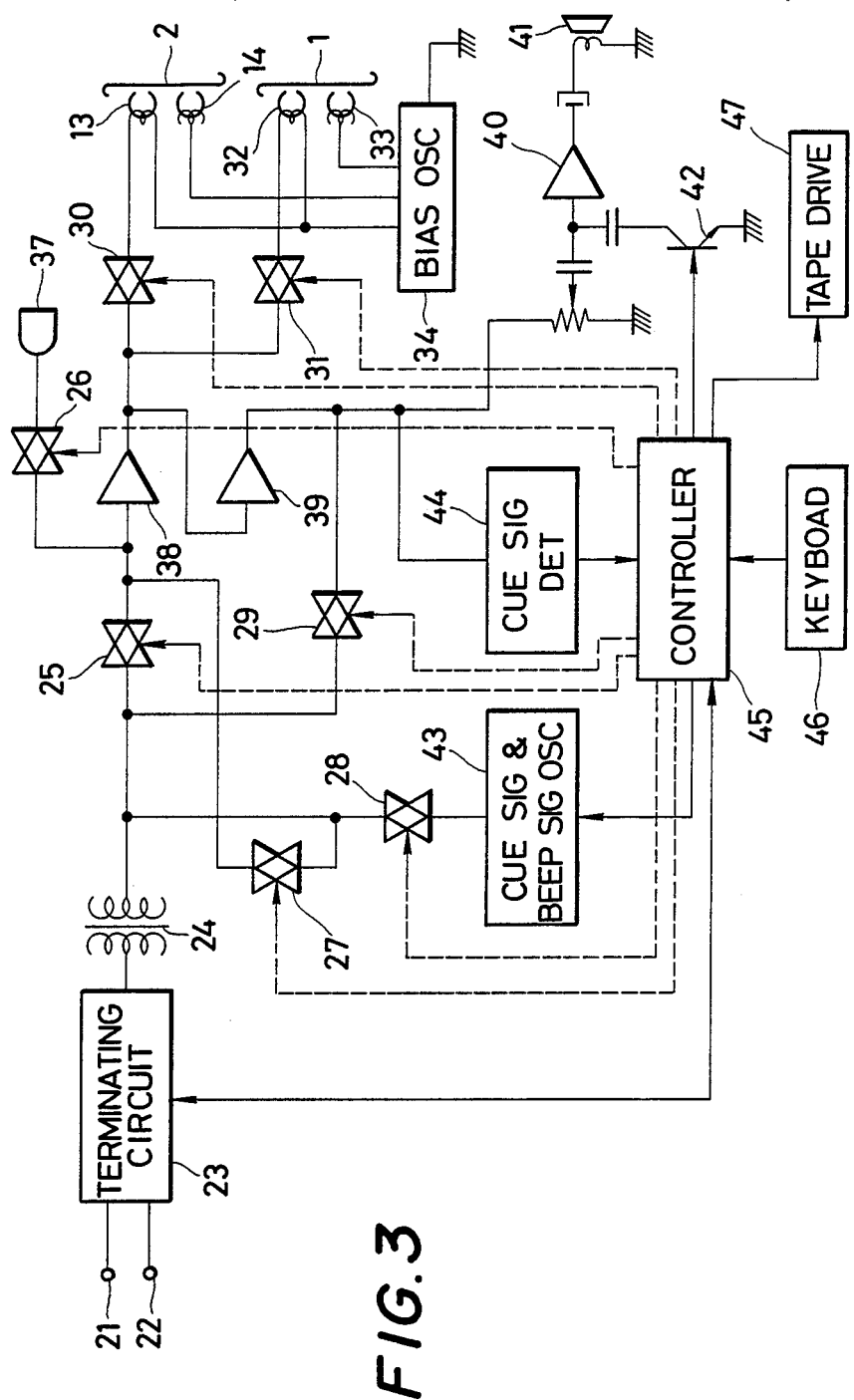
FIG. 3 is a block diagram of a recording/reproducing circuit according to a preferred embodiment of the present invention.

FIG. 3 shows a circuit for recording/reproducing the OGMs and ICMs according to an embodiment of the present invention.

In FIG. 3, reference numeral 21 denotes a receiver terminal; 22, a line terminal; and 23, a terminating circuit for closing the telephone line upon reception of an incoming call or for allowing dialing of an originating call. The automatic telephone answering apparatus comprises an insulating transformer 24, switches 25 to 31, the ICM recording/reproducing head 13 shown in FIG. 2, the ICM erase head 14, an OGM recording/reproducing head 32, an OGM erase head 33, a bias oscillator 34, a microphone 37 for recording the OGMs, a recording amplifier 38, a reproducing amplifier 39, an amplifier 40, a monitor speaker 41, a muting transistor 42, a cue signal and beep tone signal oscillator 43, a cue signal detection circuit 44, a controller 45 using a microprocessor, a keyboard 46 for externally operating the controller 45, and first and second tape drive mechanisms 47 for driving the OGM tape 1 and the ICM tape 2.

With the above arrangement, the controller 45 operates the switches 25 to 31, the oscillator 43, the tape drive mechanism 47, the muting transistor 42, and the like at predetermined timings, in accordance with the recording/reproducing operation steps described above.

In the above embodiment, the divisions between a plurality of ICMs such as $ICM_1$ to $ICM_n$ can be clearly detected by the 0.5-sec cue signals (beep tones). Since a muting portion is recorded before and after the division signal, malfunction on detection can be reliably prevented. In addition, during reproduction, the division signals can be clearly distinguished from the end signal of all the ICMs in accordance with the durations of the cue signals (beep tones). A counter for detecting the number of rotations of the reel table when the tape is rewound can be a 16-count (4-bit) counter. Therefore, the program of the microprocessor is simple. Since the division signal and the end signal of all the ICMs are recorded when each ICM is recorded, if the cassette is removed from the apparatus while it is in the automatic answering mode, the end signal of all the ICMs can still be recorded.

Thus there is provided in accordance with the invention a novel and highly-effective automatic telephone answering apparatus that accomplishes the objects of the invention as set forth above. Many modifications of the preferred embodiment of the invention disclosed herein will readily occur to those skilled in the art upon consideration of this disclosure. Accordingly, the invention is limited only by the appended claims.

What is claimed is:

1. Automatic telephone answering apparatus comprising:
   a first recording medium for recording an outgoing message to be sent to a calling party in response to a call from the calling party;
   a second recording medium for sequentially recording incoming messages from calling parties along a given direction of said second recording medium after the outgoing message is sent to respective ones of the calling parties;
   recording means for recording on said second recording medium a first muting portion having a predetermined duration after a first incoming message from a calling party is recorded on said second recording medium and for recording on said second recording medium after said first muting portion a first control signal having a predetermined duration;
   means for moving said second recording medium after the first control signal is recorded to a location such that an intermediate portion of said first control signal is opposed to said recording means;
   means for setting an incoming call standby mode enabling the reproduction and sending of the outgoing message in response to an incoming call from a new calling party while the second recording medium is fixed in position; and
   means for reproducing and sending the outgoing message in response to said incoming call from said new calling party in the incoming call standby mode and moving said second recording medium forward, said recording means recording on said second recording medium a second muting portion having a predetermined duration, so that said first control signal is modified to form a second control signal having a duration shorter than that of said first control signal and lying between said first muting portion and said second muting portion and said recording means is positioned to record said second incoming message from said new calling party on said second recording medium after said second muting portion.

2. Automatic telephone answering apparatus according to claim 1; wherein said first control signal is recorded as an end position detection signal of all the incoming messages recorded on said second recording medium.

3. Automatic telephone answering apparatus according to claim 1; wherein said second control signal is located between each two incoming messages recorded on said second recording medium and serves as a division detection signal between the incoming messages.

4. Automatic telephone answering apparatus according to claim 1; wherein said second control signal is formed by partially erasing said first control signal.

5. Automatic telephone answering apparatus according to claim 1; wherein said second control signal is formed at the same time as the second muting portion each time an incoming call from a new calling party is received.

6. Automatic telephone answering apparatus according to claim 1; wherein said first and second control signals are beep tone signals having the same frequency and different durations.

7. Automatic telephone answering apparatus according to claim 1; wherein each time a new incoming message is recorded said first control signal is recorded thereafter.

8. Automatic telephone answering apparatus according to claim 1; wherein said means for moving said second recording medium rewinds said second recording medium to the beginning of said first control signal and then moves said second recording medium forward by a distance shorter than a distance corresponding to the duration of said first control signal.

9. Automatic telephone answering apparatus according to claim 1; wherein said means for moving said second recording medium rewinds said second recording medium by a distance shorter than a distance corresponding to the duration of said first control signal.

* * * * *